United States Patent Office 3,099,076
Patented July 30, 1963

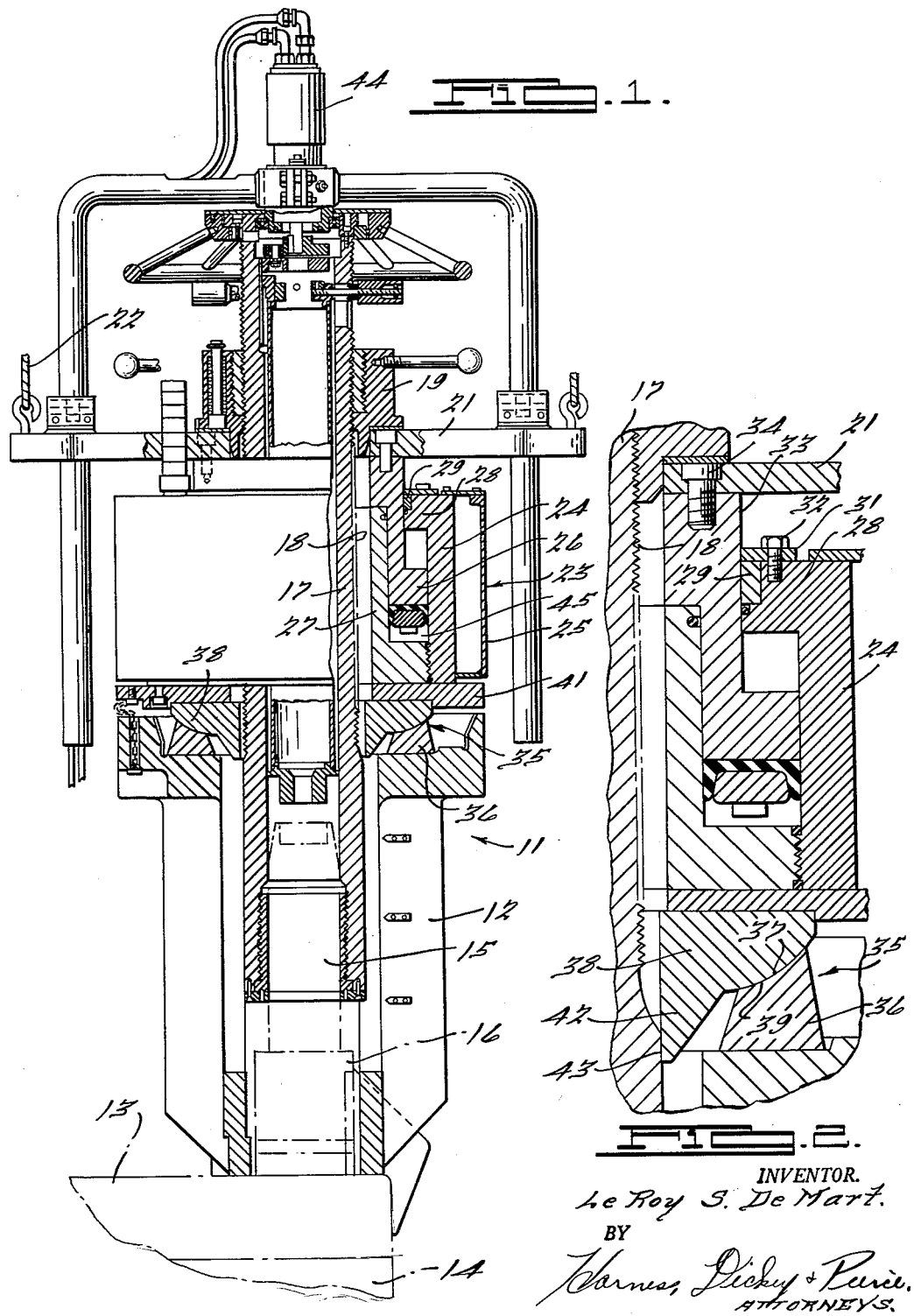

3,099,076
STUD TENSIONER
Le Roy S. De Mart, Lancaster, Ohio, assignor, by mesne assignments, to Babcock & Wilcox Company, a corporation of New Jersey
Filed Oct. 26, 1959, Ser. No. 848,849
4 Claims. (Cl. 29—252)

This invention relates to stud tensioners, and more particularly to an improved construction for supporting and guiding the reciprocating parts of such devices.

In the operation of stud tensioning devices, especially those of large size used with heavy pressure vessels, problems are created with respect to the maintenance of proper alignment among the various reciprocating parts of the mechanism. Due to the relatively great forces involved, a slight angular shifting of relatively reciprocating parts may result in a powerful wedging action which could cause considerable damage to smoothly finished surfaces.

It is an object of the present invention to provide a novel and improved construction for stud tensioners which greatly minimizes the possibility of angular misalignment between the relatively slidable force-transmitting portions of the device, so that variations in the angular position of tensioned studs or of the drawbar to which they are connected will not cause damage to the working parts of the apparatus.

It is another object to provide an improved stud tensioner construction of this nature which facilitates connection of the drawbar with each stud by permitting lateral shifting of the drawbar in order that it may be aligned with the stud.

Other objects, features, and advantages of the present invention will become apparent from the subsequent description, taken in conjunction with the accompanying drawings.

In the drawings:

FIGURE 1 is a side-elevational view partially in cross-section of a stud tensioner incorporating the principles of the invention, parts being broken away; and FIGURE 2 is an enlarged fragmentary cross-sectional view in elevation showing the aligning elements of the invention.

In general terms, the invention comprises means for maintaining alignment between the drawbar of a stud tensioner and the reciprocable motor element to which it is connected, while permitting limited lateral shifting of that end of the drawbar which is threadably engageable with the stud. In the illustrated embodiment of the invention, the stud tensioner comprises a pedestal adapted to rest on a vessel cover and carrying an annular piston and cylinder assembly at its upper end, the cylinder being supported by an upwardly concave spherical bearing mounted on the pedestal. The piston extends upwardly through the cylinder and is engageable with a thrust nut threadably mounted on the drawbar so that the drawbar may be urged upwardly away from the stud. The upper end of the cylinder carries an annular bearing which supports the piston against radial movement, and the convex portion of the spherical washer has a second radial bearing which engages the drawbar and is spaced a substantial axial distance from the first bearing. In this manner, canting or angular shifting of the piston with respect to the cylinder surfaces is substantially prevented, even though the location of a particular stud is such that the drawbar tends to be slightly angularly displaced with respect to the other tension elements.

Referring more particularly to the drawings, the stud tensioner is generally indicated at 11 and comprises a pedestal 12 adapted to rest on the edge of a cover 13 for a pressure vessel 14. Vessel 14 carries a plurality of circumferentially spaced studs 15 which extend through cover 13 and carry nuts 16. Tensioner 11 serves to elongate each stud 15 in succession so that its nut 16 may be hand tightened and apply the required force to cover 13 after stud 15 is released.

A drawbar 17 of generally tubular shape is disposed centrally of stud tensioner 11, this drawbar having means at its lower end for threadably engaging stud 15. The major portion of drawbar 17 is externally threaded, this thread being indicated at 18 and having a reduced diameter with respect to the main drawbar surface. A thrust nut 19 is threadably mounted at the upper end of drawbar 17 and engages a hanger plate 21 by means of which the stud tensioner is adapted to be suspended through cables 22.

A reciprocable motor generally indicated at 23 serves to exert an upward force on drawbar 17, this motor comprising a cylinder 24 surrounded by a reservoir 25 and a piston 26 slidably mounted within the cylinder. The cylinder has an inner wall 27 with piston 26 being of annular shape and disposed between the inner and outer walls of the cylinder. The upper end of piston 26 extends through an end portion 28 of cylinder 24, and this end portion carries a bearing 29 in a counterbore thereof, the bearing being retained by a plate 31 secured to the end cap by bolts 32. Bearing 29 serves to support the outer surface 33 of piston 26 against radial movement. The upper end of piston 26 is secured to hanger plate 21 by bolts 34. It should be noted that the inner surfaces of cylinder wall 27 as well as piston 26 are of sufficient diameter to clear the threads 18 of drawbar 17.

A spherical washer generally indicated at 35 is disposed between the upper end of pedestal 12 and the underisde of cylinder 24. This bearing comprises an annular member 36 having a concave upper surface 37 and supported by pedestal 12, this member cooperating with an annular bearing element 38 having a convex surface 39. The upper surface of element 38 supports a plate 41 engageable with the underside of cylinder 24.

Bearing element 38 is provided with a downwardly extending radial bearing portion 42 of annular shape, this bearing portion being tapered downwardly into a clearance recess in member 36 and having an inner surface 43 slidably engageable with the unthreaded outer surface portion of drawbar 17. It will be observed that bearing portion 42 is spaced a substantial axial distance from bearing 29 carried by the upper end of cylinder 24.

In operation, stud tensioner 11 will be carried to a position over a stud 12 and will be lowered until pedestal 12 rests on cover 13. Drawbar 17 may then be rotatably lowered by means such as an air operated motor 44 until its lower end is adjacent the upper end of stud 15, thrust nut 19 being rotated if necessary to adjust the axial positions of the drawbar threads. The drawbar may then be connected with the stud by further turning combined with a lateral shifting movement if necessary to properly align the parts. This shifting action will be permitted by spherical bearing 35. After the thread engagement has been initiated, further operation of motor 44 may be utilized to fully engage the stud and drawbar.

Upon application of pressure to chamber 45 of motor 23, piston 26 will be forced upwardly, urging thrust nut 19 and therefore drawbar 17 in a direction away from the stud so that the latter will be tensioned. When this is done, the particular angular position of stud 15, which may differ slightly from other studs in vessel 14, may cause a canting or shifting of drawbar 17 with respect to those portions of the stud tensioner engaging or connected with cover 13. Due to the relative positioning of bearings 29 and 42 which engage piston 26 and drawbar 17, respectively, this slight shifting or canting will be prevented from causing any angular shifting between the cooperating piston and cylinder surfaces which might result in a wedging or gouging action. At the same time, it will be noted that this novel construction will not interfere in any way with proper operation of the stud tensioner for alignment and connection of the drawbar with each stud.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a stud tensioning device, an elongated drawbar having a stud-engaging portion, bearing means supporting said drawbar for limited rocking movement relative to a stationary support, said bearing means having two annular elements with co-operating surfaces in the form of segments of a sphere, reciprocable motor means comprising piston and cylinder elements, a pedestal between one of said elements and said stationary support, the other element being connected to said drawbar, said stud-engaging portion of the drawbar being disposed within said pedestal, said piston and cylinder elements being disposed vertically of said pedestal, said drawbar being coaxial with said piston and cylinder elements whereby the drawbar may be urged in a direction away from said stud, first radial bearing means disposed between said piston and cylinder elements, and second radial bearing means carried by one of said annular elements and engageable with said drawbar at a location spaced a substantial axial distance from said first radial bearing means.

2. In a stud tensioning device, a pedestal adapted to engage a stationary support, a tubular drawbar having an externally threaded portion, a thrust nut on said threaded drawbar portion, one end of said drawbar being disposed within said pedestal and adapted to engage a stud, a reciprocable motor comprising an annular piston and cylinder disposed vertically of said pedestal, said drawbar extending coaxially through said motor, a bearing connecting said cylinder and pedestal, said bearing having two annular elements with co-operating surfaces in the form of segments of a sphere, said annular piston extending through one end of said cylinder, a connection between said thrust nut and the outer end of said piston, a radial bearing carried by said one end of the cylinder and supporting said piston, and a second radial bearing carried by one element of said first-mentioned bearing and engageable with said tubular drawbar.

3. In a stud tensioning device, a pedestal adapted to engage a stationary support, a tubular drawbar having one end disposed within the pedestal and adapted to be connected to a stud, a reciprocable motor disposed vertically of said pedestal comprising an annular cylinder coaxial with said drawbar having inner and outer walls and an annular piston extending through the upper end of said cylinder, an upwardly concave spherical bearing disposed between and connected to the underside of said cylinder and the upper end of said pedestal, said bearing having two annular elements with co-operating surfaces in the form of segments of a sphere, a thrust nut threadably mounted on said drawbar, the upper end of said piston being connected to said thrust nut, a radial bearing in the upper end of said cylinder and in supporting relation with said piston, and a radial bearing portion on one element of said spherical bearing and engageable with said tubular drawbar.

4. The combination according to claim 3, said radial bearing portion comprising a downwardly tapered extension on the upper element of said spherical bearing.

References Cited in the file of this patent

UNITED STATES PATENTS

| | | |
|---|---|---|
| 1,353,600 | McBride | Sept. 21, 1920 |
| 1,734,746 | Roberts | Nov. 5, 1929 |
| 1,876,690 | Kingsbury | Sept. 13, 1932 |
| 2,609,253 | Brown | Sept. 2, 1952 |
| 2,760,393 | Stough | Aug. 28, 1956 |
| 2,885,919 | Carlson | May 12, 1959 |

FOREIGN PATENTS

| | | |
|---|---|---|
| 120,868 | Great Britain | Nov. 28, 1918 |